Dec. 21, 1954   H. F. HOBBS   2,697,441
CENTRIFUGAL VALVE FOR FLUID CLUTCHES
Filed Oct. 10, 1952   2 Sheets-Sheet 1

Inventor
HOWARD F. HOBBS
By Young, Emery & Thompson
Attorneys

Dec. 21, 1954  H. F. HOBBS  2,697,441
CENTRIFUGAL VALVE FOR FLUID CLUTCHES
Filed Oct. 10, 1952  2 Sheets-Sheet 2

Inventor
HOWARD F. HOBBS
By
Young, Emery & Thompson
Attorneys

United States Patent Office 2,697,441
Patented Dec. 21, 1954

2,697,441

CENTRIFUGAL VALVE FOR FLUID CLUTCHES

Howard Frederick Hobbs, Leamington Spa, England, assignor to Hobbs Transmission Limited, Leamington Spa, England, a British company Application October 10, 1952, Serial No. 314,102

Claims priority, application Great Britain October 16, 1951

2 Claims. (Cl. 137—56)

This invention relates to hydraulically actuated friction clutches of the kind having a rotary housing enclosing friction elements, a pressure space in said housing for receiving fluid under pressure for engaging the friction elements, a valve bore in said housing, a movable valve element in said bore, said valve bore being disposed with one end further from the axis of said housing than the other end so as to permit movement of said valve element under centrifugal action, the outer end of said valve bore being permanently closed against escape of fluid therefrom, resilient means acting on the valve element, and suitable ducts or ports controlled by the valve element. An example of such a valve is described in the specification of our British Patent No. 637,251 and may be used in conjunction with another valve in the housing as disclosed in the said specification. The object of the invention is the provision of an improved valve, which is actuated by centrifugal force to provide smooth automatic engagement of the clutch when some pre-determined speed is reached; prevents clutch engagement at low speeds which might stall the engine; and which will permit engagement of the clutch when the clutch housing, which carries the valve, is stationary, so that in a vehicle the engine can be started by towing or running downhill.

According to the invention, a hydraulically actuated friction clutch has a rotary housing enclosing friction elements, a pressure space in said housing for receiving fluid under pressure for engaging the friction elements, a valve bore in said housing, a first inlet duct and a first outlet duct in said housing for supplying fluid under pressure to and exhausting said fluid from said valve bore respectively, said outlet duct being located adjacent said valve bore, a movable valve element in said bore, said valve bore being disposed with one end further from the axis of the said housing than the other end so as to permit movement of said valve element under centrifugal action, the outer end of said valve bore being permanently closed against escape of fluid therefrom, said valve element having openings whereby said inlet and outlet ducts are brought into communication when said valve element is in an intermediate position in said valve bore, for exhausting fluid under pressure, resilient means acting on said valve element in opposition to movement of said valve element caused by centrifugal force and serving to keep said valve element in exhaust closing positions during conditions of said housing from and including stationary, to a low predetermined speed of rotation thereof, a second inlet duct in said housing leading from said pressure space to the outer end of the said valve bore, serving to open the pressure to the outer end of said valve element whereby the pressure acts on the element in opposition to movement of said valve element caused by centrifugal force, and a second outlet duct controlled by said valve element to open to the outer end of the said valve bore just prior to commencing the inward closing movement of said first inlet duct.

According to a modification of the invention the clutch has a second movable valve element in the inner end of said bore, said second valve element being adapted to close said first outlet duct and a second resilient means acting on the said second valve element in the same direction as centrifugal force tending to move said second valve element to the outlet closing position.

A valve constructed in accordance with the invention provides:

(1) An exhaust which enables the clutch to become disengaged while the engine is running at idling speeds.

(2) A condition of partial exhaust over some predetermined range of speeds under which the clutch is substantially but not wholly free so that immediate response is obtained when speeds are increased, and so that on over-run there will be a drag which increases with engine speed and which will ensure that the clutch is automatically brought into engagement.

(3) A gradual build up in engaging pressure in accordance with speed and a final exhaust closing action whereby the full pressure supplied to the clutch is maintained on the friction surfaces.

(4) A condition when the clutch is at rest in which all exhausts are closed so as to enable, for example, an engine to be started by towing or running a vehicle down hill.

(5) Means to prevent condition (4), and consequent stalling at all times except when the clutch is stationary or rotating at pre-determined low speeds.

The invention will now be further described by way of example with reference to the accompanying diagrammatic drawings wherein Figures 1, 2, 3 and 4 are sectional views in a plane containing the axis of a clutch made in accordance with the invention showing only parts concerned in the present invention but showing the valve in different positions of operation.

This valve may replace the valve 5 in the apparatus shown in specification of our British Patent 637,251.

Figure 3:
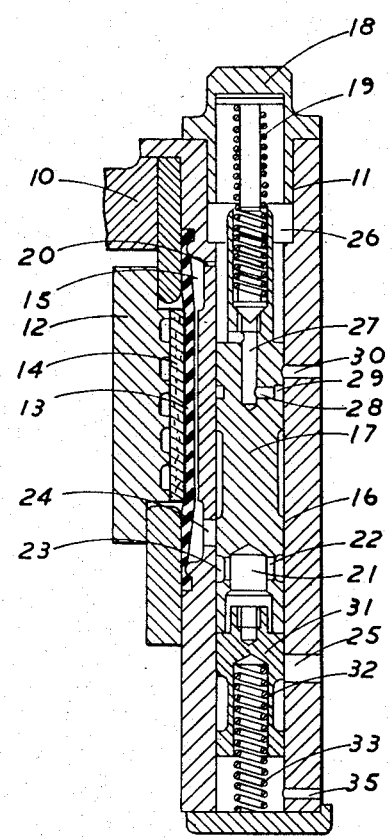
Fig. 3 shows the clutch engaged for over-run starting.
Figure 4:
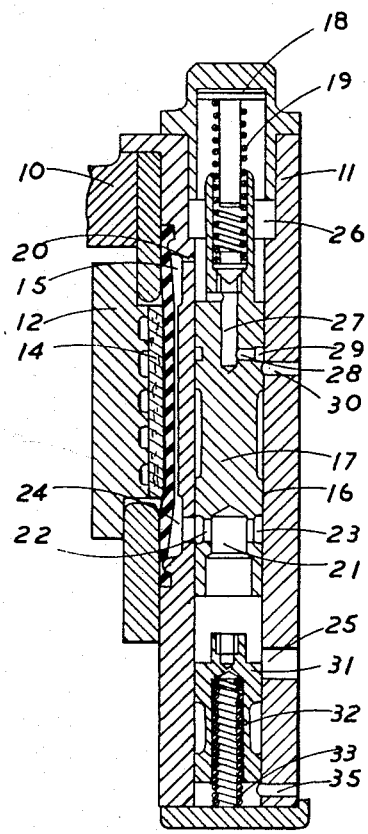
Fig. 4 shows the clutch disengaged.

According to one construction form of the invention, a rotary housing, part of which is shown 10, 11, encloses friction elements. The pressure plate 12 comprises one of the friction elements, to engage another friction element (not shown) such as a spinner plate carried by an output shaft. The friction element 12 is carried by the housing, and is movable axially by the flexible ring shaped diaphragm 13, between which and the pressure plate is an insulating ring 14. The part of the housing 11, hereinafter referred to as the valve body, is so shaped as to provide an annular space 15 behind the diaphragm. This serves as a liquid pressure space to which liquid is supplied for engaging the clutch, while exhaust of liquid from said space enables the clutch to be disengaged. The valve body is provided with a radially disposed cylindrical bore 16 which contains a slidable valve piston 17. The outer end of the bore is closed by cap 18. A spring 19 is provided in the bore, one end of which abuts against the cap and the other end of which engages against the slidable piston. An inlet duct 20, herein referred to as the second inlet duct leads from the pressure space in the valve body to the cylindrical bore so that at all times pressure acting in the space also acts on the outer end of the slidable piston, i. e. into space 26, tending to move it inwards. The outer end of the piston is reduced in diameter so as to leave the duct 20 always uncovered. The inner end of the piston has a central drilling 21 which is connected by cross drillings 22 to an annular groove 23. The bore is connected to the pressure space 15 by another drilling 24—referred to as the first inlet duct—and in certain positions such as shown in Figure 4, the groove 23 will communicate with the first inlet duct 24 so as to allow pressure to escape through the drilling in the piston. A further drilling 25 is provided near the inner end of the bore, herein referred to as the first outlet duct, for exhausting the liquid from the bore into a stationary casing (not shown) enclosing the clutch. The outer end of the piston has a central drilling 27 which is connected by cross drillings 28 to a second annular groove 29, and a further drilling or opening 30, referred to as the second outlet duct, is provided which leads from the cylindrical bore to the outer part of the valve body. When the housing is stationary, the spring 19 holds the piston 17 in the innermost position—as shown in Figure 3—and the first inlet duct is closed by the piston.

Figure 1:
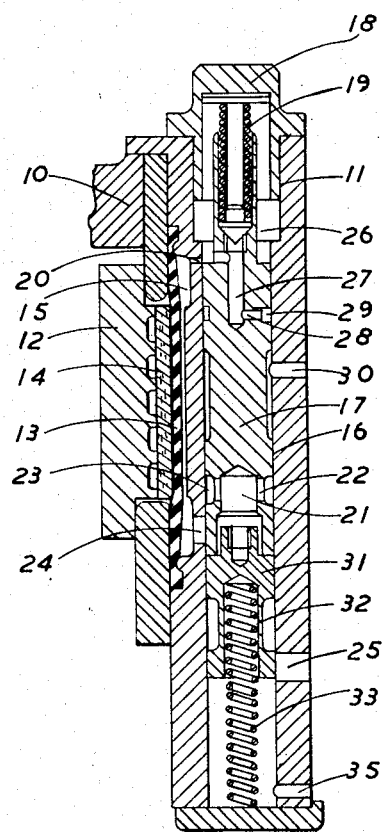
Fig. 1 shows the clutch engaged.
Figure 2:
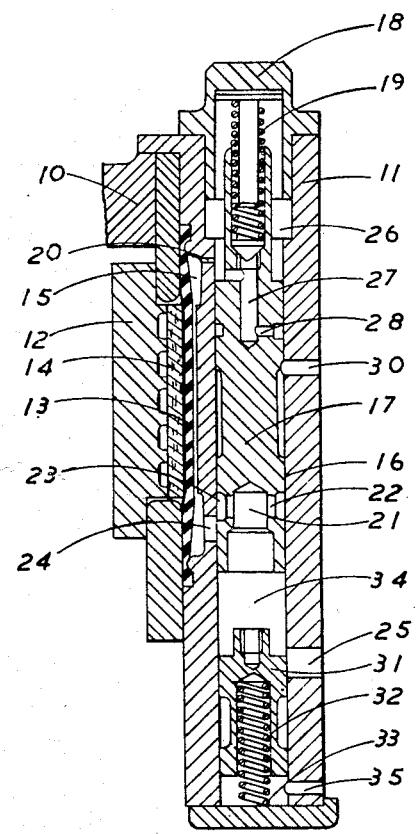
Fig. 2 shows the clutch partially engaged (during take up of clutch)

This exhaust-closed condition is maintained from the stationary condition of the housing up to a low predetermined speed i. e. a speed below the idling speed of the engine but sufficient for starting of the engine so that a small predetermined pressure is built up in the space 15. The speed of the housing will then rapidly increase to idling speeds and during this increase the piston 17 will move out, momentarily opening the duct 24 to space 34 and duct 30 to space 26 but immediately reaching the idling speed position of Figure 2 in which the ducts 24, 30 are closed by the piston. When in the outermost position (during normal running at higher speeds than idling) shown in Figure 1, the first inlet duct 24 is also closed, so that in the positions of both Figures 1 and 3 there is no communication between first inlet duct and first outlet duct and fluid pressure can be built up within the pressure space 15. When in an intermdiate position, shown in Figure 4, the groove in the piston will mate with the first inlet duct 24 and the pressure can therefore escape through drillings 21, and the first outlet duct 25. Also in this intermediate position, the second groove 29 is so located that further inward movement of the piston will open the groove to the second outlet duct 30, and thereby the space 26 at the outer end of the piston to exhaust. The mass of the piston is so arranged that over certain selected speeds of an input member to which the rotary housing 10, 11 is attached, such as given with an engine when idling, the piston takes up the said intermediate position and is held in this position against the action of centrifugal force by the liquid pressure acting on the outer end of the piston, which is assisted by the spring 19. At higher speeds, the piston will tend to move outwards, thereby tending to close the first inlet duct and causing increased pressure in the space (as for example shown in Figure 2). The increased pressure in the spaces 15, 26, acts on the outer end of the piston, tending to move it inwards, so that for any given speed of rotation a given pressure will be maintained in the space. A pump (not shown) delivers oil to the space 15 under pressure, through a valve or cock and another valve (as shown in the specification of British Patent No. 628,499 or U. S. Patent 2,620,814). Maximum pressure in the space will be provided by the pump with the addition of that due to centrifugal action on the rotating fluid. This pressure will act on the outer end of the piston for at certain speeds the force on the piston due to centrifugal action will exceed the pressure acting on the outer end of the piston, and the piston will move fully outwards (shown Figure 1) thereby completely closing the first inlet duct.

Over a certain selected range of idling speeds, some pressure will be maintained in the space 15, since the spring will not be strong enough by itself to resist the centrifugal force on the piston. In a clutch of this kind, disengaging springs are usually provided but the mass of the piston will be so selected that the pressure in the space will be slightly in excess of that required to counteract the disengaging springs, so that, when idling, the friction surfaces of the clutch will be held in light contact.

In some circumstances, when idling, the pressure in the space 15, and therefore the space 26, is likely to exceed that required to balance the centrifugal action on the piston; for example when such a clutch is first started up with cold oil, considerable back pressure may result, and the pressure exceed the centrifugal action, the piston will move inwards thereby commencing to close the first inlet duct, which would cause increased pressure to act in the spaces 15, 26, with the result that the piston would move fully inwards thereby fully closing the first inlet duct 24 and engaging the clutch. This would cause the engine to stall. An irregular idling speed may produce the same result. With the present invention in such circumstances, the second groove 29 will open to the exhaust 30 as soon as movement commences to close the first inlet port 24, thereby exhausting, or greatly reducing, pressure in the space 26 at the outer end of the piston. It will be understood that the second inlet port 20 is of small cross-sectional area as compared to the second outlet duct 30. The reduction in pressure in the space 26 thereby prevents further movement of the piston and causes it to take up a stable position whereby the pressure acting in the space 15 is in accordance with the centrifugal force due to the mass of the valve whether the oil is hot or cold, and irrespective of tendency to build up back pressure.

Upon over-running the spinner plate will apply drag to the friction member 12 and rotate the housing and engage the clutch.

In some applications, it is not convenient to provide the piston with suitable mass to maintain the required amount of pressure in the space 15 during the idling condition. It may be, for example that if the mass is sufficiently great for this purpose the speed at which full engagement takes place may be too low. In these circumstances, the invention provides a second and inner piston 31. The piston 31 is of as low mass as convenient so as not to be greatly effected by centrifugal force. The inner end of the piston is provided with a bore 32 to enclose a spring 33 so arranged as to urge the piston ontwards. In the outer position the piston will move beyond the first outlet duct 25 thereby preventing the escape of oil from the pressure space. The pressure of the fluid will however act on the outer end of the piston, i. e. in the space 34, tending to move it inwards against the spring 33, and to the position in which the first outlet duct 25 is partially or wholly opened. The exhaust 35 is provided to prevent liquid being trapped at the inner end of the piston 31. During idling conditions therefore, pressure in the space 15 will be maintained at some minimum pressure, not less that required to balance the force from the spring 33.

Since the piston has some mass there will be variation in pressure with idling speed, but a pre-determined minimum pressure will always be maintained irrespective of the speed at which the clutch is idling. This ensures that some minimum "drag" is maintained by the clutch. Should a clutch become completely free at some given idling speed, the driven part of the mechanism to which it is fitted may over-run. With the present invention should over-run tend to take place, the "drag" will tend to increase the speed of the driving part and hence the "drag" will be increased by the action of the piston 17. This results in automatic engagement. A further disadvantage resulting from a clutch which becomes completely free is the lag which takes place when speed is increased, since the friction surfaces must be moved into engagement before the increased pressure can take effect. The main purpose of the spring 19 is to move the piston 17 to the innermost position should the rotary valve body 17 become stationary, or nearly so. This enables the clutch to be engaged, for as the first inlet duct is closed an engine may for example be started by towing, or running a vehicle to which the clutch is fitted down hill. With the spring 33 fitted, the spring 19 must exert sufficient force to overcome the force from the spring 33, and to slide the piston 17 in its bore.

I claim:

1. In a hydraulically actuated friction clutch having friction elements engaged by fluid pressure, a centrifugal valve comprising, a rotary housing, a valve bore in said housing, a first inlet duct and a first outlet duct in said housing for supplying fluid under pressure to and exhausting said fluid from said valve bore respectively and a movable valve element in said bore, said valve bore being disposed with one end further from the axis of the said housing than the oher end, so as to permit movement of said valve element under centrifugal action, the outer end of said valve bore being permanently closed against escape of fluid therefrom, said valve element having openings whereby said inlet and outlet ducts are brought into communication when said valve element is in an intermediate position in said valve bore, for exhausting fluid under pressure, resilient means acting on said valve element in opposition to movement of said valve element caused by centrifugal force and serving to keep said valve element in exhaust closing positions during conditions of said housing from and including stationary, to a low predetermined speed of rotation thereof, a second inlet duct in said housing leading to the outer end of the said valve bore, serving to open fluid pressure to the outer end of said valve element whereby the pressure acts on the element in opposition to movement of said valve element caused by centrifugal force, and a second outlet duct controlled by said valve element to open to the outer end of the said valve bore just prior to commencing the inward movement of the valve element closing said first inlet duct.

2. A centrifugal valve as claimed in claim 1 having a second movable valve element in the inner end of said bore, second resilient means acting on said second valve element to cause movement of said second valve in the same direction as caused by centrifugal force, and tending to hold said second valve element in exhaust closing positions, closing said first outlet.

References Cited in the file of this patent

UNITED STATES PATENTS

| Number | Name | Date |
|---|---|---|
| 2,521,239 | McDowall et al. | Sept. 5, 1950 |
| 2,544,551 | Black | Mar. 6, 1951 |
| 2,619,978 | Grandgirard | Dec. 2, 1952 |

FOREIGN PATENTS

| Number | Country | Date |
|---|---|---|
| 938,374 | France | Apr. 5, 1948 |
| 637,251 | Great Britain | May 17, 1950 |